INVENTOR
Charles Rex Barkley
By Corbett, Mahoney, Miller & Rambo

Aug. 29, 1961 C. R. BARKLEY 2,997,778
APPARATUS FOR ASSEMBLING AND SECURING
BALL BEARINGS WITHIN A RETAINER
Filed April 1, 1958 2 Sheets-Sheet 2

INVENTOR
Charles Rex Barkley
By Corbett, Mahoney, Miller & Rambo
BY W. N. Rambo
ATTORNEYS United States Patent Office 2,997,778
Patented Aug. 29, 1961

2,997,778
APPARATUS FOR ASSEMBLING AND SECURING BALL BEARINGS WITHIN A RETAINER
Charles Rex Barkley, New Lexington, Ohio, assignor to Lempco Industrial, Inc., Bedford, Ohio, a corporation of Ohio
Filed Apr. 1, 1958, Ser. No. 725,596
7 Claims. (Cl. 29—201)

This invention relates to apparatus for assembling and securing ball bearings within a retainer. More specifically, the invention has reference to the production of bearings of the type utilizing cylindrical retainers having the walls thereof formed with a multiplicity of spaced openings for the reception and retention of associated bearing elements. The invention is especially concerned with improved means for the positioning and retention of bearing elements in such openings.

Such bearings are adaptable for use in many different capacities in lieu of plain bearings, for example, in the guidance of the posts of punch and die sets for punch presses, as shown in the patent of Conner, No. 2,422,774 of June 24, 1947. It will be understood, however, that many other practical applications of such bearings may and are being made. In the manufacture of such bearings, in quantity production, certain difficulties, delays and costs are involved in producing the same with present methods and appliances. Particularly is this true in the matter of depositing a ball element in each of the many openings provided for their reception in the sleeve-like retainer of the bearing. Also, in the operations of positively confining each element within its opening against displacement or loss.

It has been customary to deposit individually each ball element, usually by a manually performed operation in each retainer opening. Thereafter, upon such deposit, the retainer wall has been locally displaced by peening or staking operations adjacent each ball-containing opening, to confine permanently the ball elements in such openings. These operations, being largely individually performed on each opening and ball element, are slow and costly, and it will be appreciated that to obtain proper centering of the ball elements in said openings, so that when so mounted they will be enabled to turn freely, requires a high degree of attention, skill and care on the part of workers performing the operations.

A general object of the invention is to provide an improved system for simplifying and expediting the manufacture of cylindrical ball-bearing assemblies and reducing costs incident thereto.

Another object of this invention is to provide an improved system for positioning and confining in each opening of such a cylindrical bearing retainer for freely rolling movement therein and antifriction ball element.

A further object is to provide means for quickly and accurately depositing a ball element in each wall opening of the sleeve-like retainer of the ball-bearing assembly and for simultaneously staking or peening the outer end of such opening so that the ball will be retained therein and will be freely rotatable therein.

The system of this invention is illustrated by two examples in the accompanying drawings but it is to be understood that the invention may take other forms without departing from basic principles.

Figures 1, 6, 7:
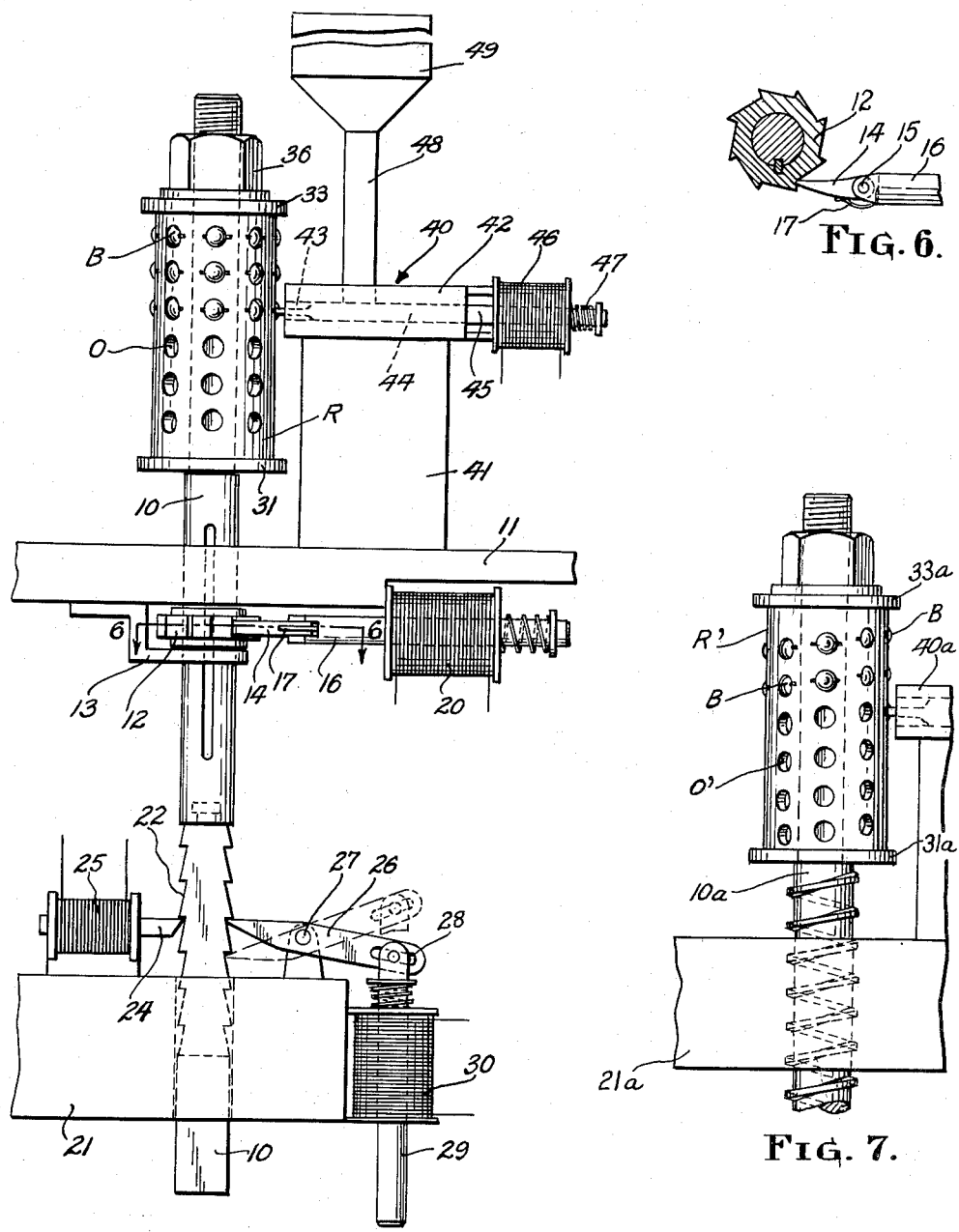
FIGURE 1 is a diagrammatic side elevational view of apparatus in which this invention is embodied.
FIGURE 6 is a horizontal sectional view taken along line 6—6 of FIGURE 1.
FIGURE 7 is a view similar to FIGURE 1 but showing a modification of the apparatus.
Figure 3:
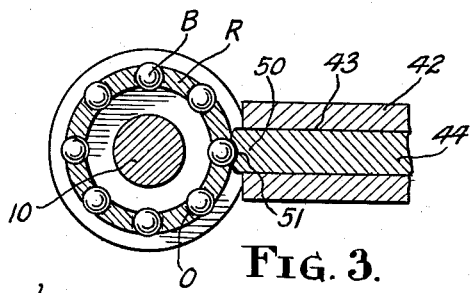
FIGURE 3 is a horizontal sectional view taken along line 3—3 of FIGURE 2.
Figure 5:
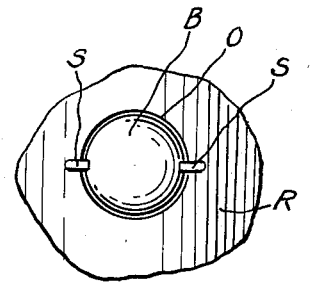
FIGURE 5 is an enlarged face view of one of the openings in the retainer with a ball staked therein.
Figure 2:
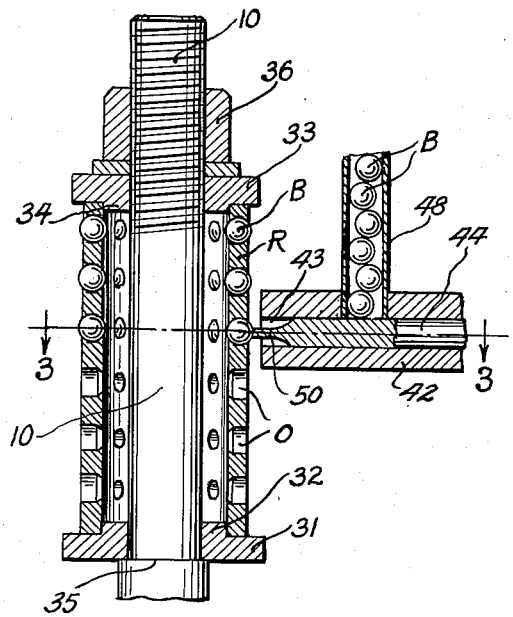
FIGURE 2 is a vertical sectional view through a ball retainer and the associated ball feeder and staker of the apparatus.
Figure 4:
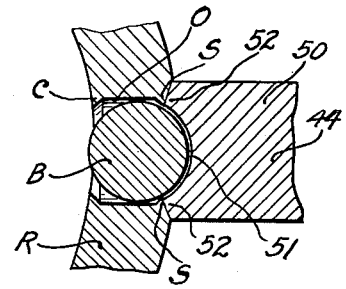
FIGURE 4 is an enlarged sectional detail showing the staking tool acting on the outer end of the ball-receiving opening to stake the ball therein.

With reference to the drawings, there is illustrated in FIGURES 1 to 5, the cylindrical or sleeve-like bearing retainer R which has a plurality of openings O extending through the wall thereof. Each opening is cupped inwardly at its inner end as at C and will receive and retain a ball B which will be of less diameter than the main part of the opening O but of greater diameter than the cupped inner end C of the opening. Thus, the ball B will not drop outwardly through the cupped inner end of the opening O when it is inserted therein.

The present invention relates to the positioning of a ball B in each opening O and the simultaneous staking or peening of the outer end of the opening to retain the ball therein. In this operation the outer end of the opening O is peened or staked at diametrically opposed points to form the stakes S which will project inwardly into the opening so that the distance therebetween is less than the diameter of the ball B. Consequently, the ball will be retained in the opening but a segment thereof may project outwardly therefrom and will be freely rotatable therein. It will be noted that in the retainer shown in FIGURES 1 to 5, the openings O are arranged uniformly in vertical columns and horizontal rows of spaced openings.

The apparatus shown in these figures for positioning a ball B in each opening O comprises a vertically disposed retainer supporting spindle 10 which is mounted for both vertical and rotative movement on a machine base 11.

Means is provided on the apparatus for rotatably indexing the spindle 10. For this purpose, splined to the spindle is a ratchet wheel 12 which is retained in a fixed horizontal position by a bracket or yoke 13 which is fixed to the lower surface of the base 11. The ratchet wheel 12 is advanced step-by-step by means of the pawl 14 pivoted at 15 to the outer end of the reciprocable rod 16, the pawl being urged into contact with the wheel 12 by the spring 17. The rod 16 is reciprocated by means of a solenoid 20.

Means is also provided for indexing the spindle 10 vertically. For this purpose, the lower portion of the spindle is mounted for vertical sliding movement in a support 21 which carries such indexing mechanism. The lower portion of the spindle is provided with a set of annular ratchet teeth 22. For cooperating with the teeth 22 at one side of the spindle 10 there is provided a latch 24 which is adapted to be released by a solenoid 25 mounted on the support 21. For cooperating with the teeth 22 at the diametrically opposite sides of the spindle, a pawl lever 26 is provided and is pivoted to the support at 27, its inner end being in engagement with the teeth 22 and its outer end being connected by a pin and slot connection 28 to the upper end of the core rod 29 of the solenoid 30 which is attached to the support 21. Each successive energization of the solenoid 30 will index the spindle 10 vertically upwardly one notch, and the spindle will be held in the indexed position by the latch 24.

The retainer R is supported on the upper end of the spindle 10 by slipping it over the upper end of the spindle onto a locator 31. This locator is a removable disc which slides over the spindle into contact with a horizontal shoulder 35, the locator being provided with a central boss 32 over which the lower end of the retainer is disposed. A similar locator disc 33 is slidably mounted on the upper end of the spindle and is provided with a depending locating boss 34 which fits into the upper end of the retainer. A clamp bolt 36 is threaded on the upper end of the spindle 10 above the locator 33. Obviously, the retainer will be clamped between the members 31 and 33 for rotation and vertical movement with the spindle.

The ratchet mechanism including the ratchet wheel 12 is such that upon each successive energization of the solenoid 20, the retainer R will be rotated a distance equivalent to the angular spacing of two adjacent openings O in a horizontal row. The vertical indexing by the mechanism including the solenoid 30 will be through a distance corresponding to the vertical spacing of adjacent openings in each column.

For positioning a ball B in each of the openings O and retaining it therein by means of a staking operation, a positioning and staking unit 40 is provided adjacent the upper end portion of the spindle 10. This unit is supported on a support 41 upstanding from the base 11. The unit 40 includes a tubular guide 42 which has its axis horizontally disposed and at right angles to the axis of the spindle 10. This unit 40 is provided with a guide bore 43 centrally thereof, open at its forward or outer end and in which a tool 44 is reciprocably mounted. This tool is a ball feeding and positioning tool as well as a staking tool but will be referred to simply as a staker.

The staker 44 may be reciprocated by any suitable means, and as illustrated in FIGURE 1 of the drawings, the staker forms a continuation of the armature 45 of an electrically-actuated solenoid 46. The solenoid 46 is arranged upon energization to advance the staker 44 outwardly toward the spindle 10 in a fast, snap action. The armature and staker are normally held in an inwardly retracted position by means of the compression spring 47.

Leading radially downwardly into the guide bore 43, intermediate its length, is the tubular magazine 48 which extends downwardly from a ball hopper 49. As shown best in FIGURE 2, the magazine 48 will provide a single column of balls, the lowermost one of which will drop into the guide bore 43 when the staker 44 is withdrawn behind the outlet end of the magazine 48. The bore 43 will be of just slightly greater diameter than the diameter of the balls. The forward end of the staker 44 is flattened to provide a thin flat horizontally disposed end 50 and the extremity of this flattened end 50 is provided with an arcuate recess or yoke 51 complemental to the curvature of the ball. At each end of the arcuate recess 51 the staking bits 52 are formed on the tool.

In the operation of the apparatus shown in FIGURES 1-6, assuming the staker 44 to be in its fully retracted position to permit a ball B to pass by gravity from the magazine 48 into the guide bore 43, energization of the solenoid 46 snaps the staker 44 forwardly to advance the ball B within an aligned opening O of the retainer, while at the same time, causing the staking bits 52 of the staker to engage the outer surface of the retainer, adjacent the opening O, with such force as to displace or swage the stakes S radially inwardly of the outer end of the opening. The distance between the stakes S is less than the diameter of the ball B, thus retaining the ball within the opening of the retainer. Upon deenergization of the solenoid 46, the staker is returned to its retracted position by means of the spring 47 to receive another ball from the magazine 48. At this time, the solenoid 20 is energized to rotate the retainer one increment to bring the next ball-receiving opening O into axial alignment with the guide bore 43 of the staking unit and the solenoid 46 is once again energized to load and stake this next opening. The successive energization of solenoids 20 and 46 is continued until all of the openings in the uppermost horizontal row of openings in the retainer are filled and staked. At this time, the solenoid 30 is energized to raise the spindle 10 and the retainer R upwardly one increment, to thereby bring the next horizontal row of openings into alignment with the staking unit. The loading and staking of each successive horizontal row of openings is continued until all openings of the retainer are filled with balls and properly staked. At this time, the completely loaded and staked retainer is removed from the spindle and the latter returned to its original, lowered position to receive another empty retainer for a succesive cycle of operation.

As will be understood, the solenoids 20, 25, 30, and 46 may be controlled by appropriate electric switches or timers, not shown, to provide for the automatic loading, staking and indexing of the retainers.

In the arrangement shown in FIGURE 7, the bearing retainer R' has the openings O' arranged in a helical pattern. The ball-positioning and staking unit 40a is exactly like the unit 40 and is positioned relative to the spindle 10a in the same manner. However, the spindle 10a is threaded into the supporting base 21a. Suitable means will be provided for incrementally rotating the spindle 10a and it will be understood that since the spindle is in the form of a screw having the same pitch as the helical pattern of the openings O', it will thread upwardly through the base 21a to index the openings O' successively relative to the unit 40a. The retainer R' will be clamped to the spindle by the members 31a and 33a in the same manner as in the form of the apparatus previously described and shown in FIGURE 1. Thus, with this modified form of the invention also, the ball-receiving openings O' are succesively indexed relative to the ball-positioning and staking unit 40a.

It will be apparent that this invention provides for supporting the bearing retainer on suitable indexing mechanism in association with a ball-positioning and staking unit. The indexing mechanism will serve to bring each ball-receiving opening successively into alignment with the ball-positioning and staking unit. As each opening is aligned with the staker, the staker will be actuated to push the ball into such opening and to simultaneously stake the outer end of the opening so that the ball cannot be removed therefrom. The inner end of the ball-receiving opening has previously been so formed that the ball cannot be removed at that end and both ends of the opening are formed to permit the ball to project slightly therefrom and to freely rotate in the opening.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. Apparatus for simultaneously loading and securing balls within a perforate, cylindrical ball bearing retainer comprising means for movably supporting a cylindrical retainer having a multiplicity of relatively spaced ball-receiving sockets opening radially outwardly of said retainer; and a combined ball-loading and retainer-staking tool mounted adjacent the retainer-supporting means in perpendicular relation to the axis of a retainer supported on said means and operable to advance a ball element radially into a socket of said retainer and simultaneously upon advancement of said ball to stake the retainer adjacent said socket and thereby retain said ball element therein.

2. Apparatus as defined in claim 1, including means connected with the retainer-supporting means for moving the latter and a retainer supported thereon in rotational and axial increments, whereby to bring successive ball-receiving sockets of the retainer into registry with said tool.

3. Apparatus for simultaneously loading and securing balls within a radially perforated, cylindrical ball bearing retainer, comprising means for movably supporting a retainer with its perforations exposed; a combined ball-loading and staking device positioned adjacent said retainer supporting means, said device comprising a ball guide disposed radially outwardly from said supporting means, a staker reciprocable in the guide, a ball magazine having an outlet arranged to discharge balls successively into the guide, and means for reciprocating the staker to advance a ball through said guide and into an exposed perforation of said retainer and to cause said staker simultaneously to stake said retainer adjacent said last named perforation to retain the ball therein.

4. Apparatus as defined in claim 3, wherein said staker includes a flattened outer end portion having a ball-receiving recess formed therein and having staking bits disposed on each side of said recess.

5. Apparatus for loading and securing balls successively in each of a plurality of ball-receiving openings formed radially in and spaced circumferentially around a sleeve-like ball bearing retainer, comprising means for supporting the retainer with the ball-receiving openings exposed, a combined ball-loading and staking device positioned adjacent the retainer-supporting means, means for indexing the retainer-supporting means and a retainer supported thereon to successively bring each of the openings of the retainer into alignment with said device, said device comprising a ball guide disposed at right angles to the axis of the retainer, a staker reciprocable in the guide, a ball magazine having an outlet arranged to discharge balls successively into said guide, and means for reciprocating the staker to advance a ball through said guide and into an opening of the retainer and simultaneously cause said staker to strike the outer surface of the retainer adjacent said opening to stake the same.

6. Apparatus as defined in claim 5, in which the retainer-supporting means comprises a spindle having means for clamping a retainer thereon in axial alignment therewith, and means for rotating the spindle and for moving the latter axially to index said ball-receiving openings relative to said device.

7. Apparatus as defined in claim 6, wherein said spindle comprises a screw threaded portion threadedly received in an associated support.

References Cited in the file of this patent

UNITED STATES PATENTS

| | | |
|---|---|---|
| 848,776 | Sisson | Apr. 2, 1907 |
| 1,419,519 | Rockwell | June 13, 1922 |
| 1,627,965 | Gamble | May 10, 1927 |
| 1,991,723 | Betz | Feb. 19, 1935 |
| 2,216,878 | Densmore | Oct. 8, 1940 |
| 2,646,761 | Knobel | July 28, 1953 |
| 2,765,686 | Deline | Oct. 9, 1956 |
| 2,897,582 | Blazek | Aug. 4, 1959 |